United States Patent [19]

Keith

[11] 4,141,185
[45] Feb. 27, 1979

[54] SOLAR COLLECTOR COVER

[76] Inventor: Elvin W. Keith, 1115 E. 31st, Kearney, Nebr. 68847

[21] Appl. No.: 797,979

[22] Filed: May 18, 1977

[51] Int. Cl.² .............................................. E06B 7/12
[52] U.S. Cl. ...................................... 52/171; 52/304; 52/788; 126/270
[58] Field of Search ................. 52/304, 171, 616, 306, 52/308, 622; 126/270, 271; 428/34, 38

[56] References Cited

U.S. PATENT DOCUMENTS

| | | | |
|---|---|---|---|
| 4,018,211 | 4/1977 | Barr | 126/270 |
| 4,038,797 | 8/1977 | Hermann et al. | 52/616 X |
| 4,038,965 | 8/1977 | Lyon | 126/271 |

Primary Examiner—Ernest R. Purser
Assistant Examiner—Carl D. Friedman
Attorney, Agent, or Firm—Henderson, Strom, Sturm, Cepican & Fix

[57] ABSTRACT

An improved solar collector cover for reducing energy loss in flat plate solar collectors is disclosed. The cover provides a solar radiation transmitting material containing a plurality of sealed evacuated passageways or cavities.

6 Claims, 9 Drawing Figures

U.S. Patent  Feb. 27, 1979  Sheet 1 of 2  4,141,185
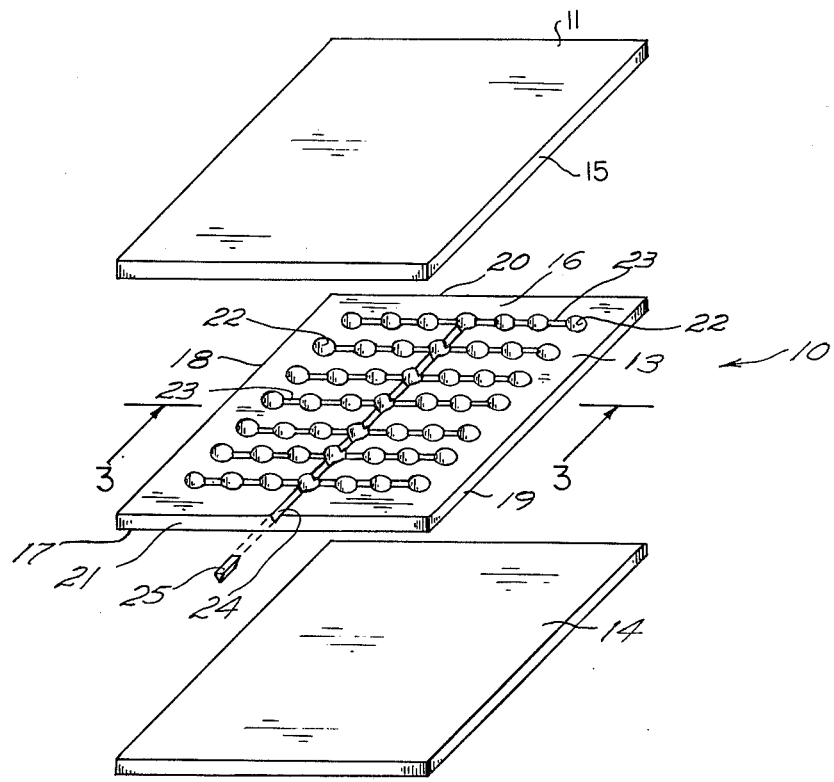
FIG. 1
FIG. 3
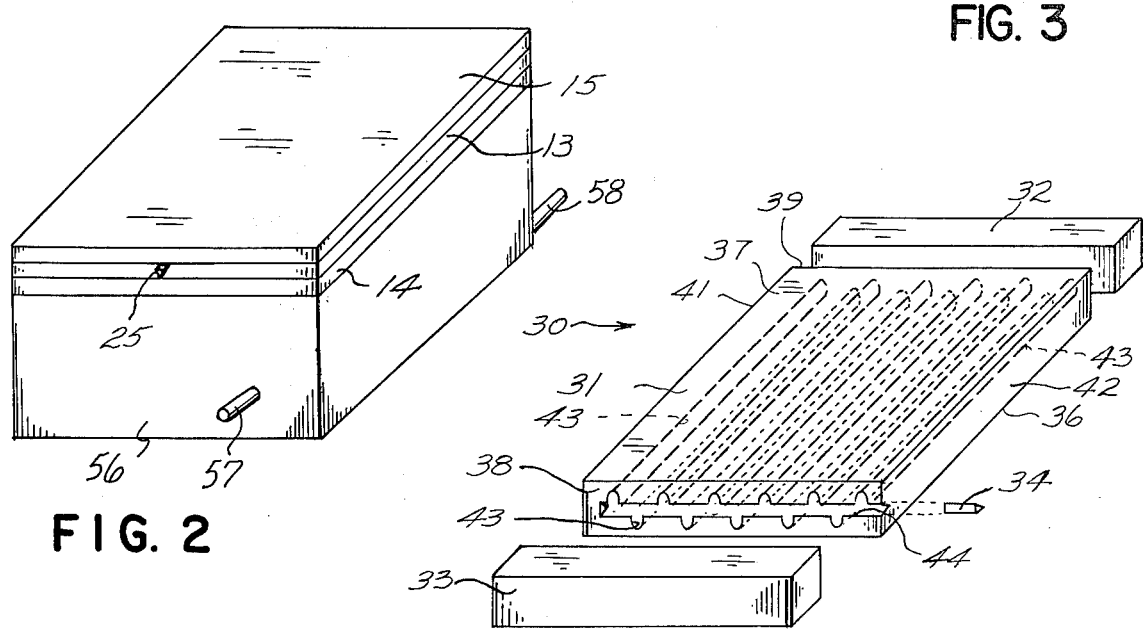
FIG. 2
FIG. 4

SOLAR COLLECTOR COVER

BACKGROUND OF THE INVENTION

This invention relates generally to solar collector covers and specifically to such covers which transfer or admit solar radiation to an energy exchange component of the solar collector.

With the apparent shortage of traditional energy sources in the United States, a greatly increased effort has been made to obtain usable energy from the sun. One prevalent method for collecting solar energy utilizes an energy exchange mechanism such as an element which is heated by solar radiation and the heat thus produced is transferred from the heated element for storage or use elsewhere by a fluid transferring medium such as water or air. This type of solar collector is generally designed so that the elements to be heated are arranged in a flat plate or series of flat plates with maximum exposure to the suns rays. The efficiency of such flat plate solar collectors is limited by the heat energy loss through the front cover.

One method of limiting the loss of energy through the front cover is to utilize multipane covers with optimum spacing between covers. Another method is to incorporate a special reflective coating on the cover surfaces. The use of these techniques have not increased efficiency of flat plate solar collectors by a large factor. Solar collector covers commonly in use demonstrate a substantial heat loss through the front cover, thereby limiting the efficiency of the collector.

There is, consequently, a need for a solar collector cover that is simple, easily constructed, economical, self-contained, and one which minimizes the heat loss when in use, thereby increasing the efficiency of the solar collector.

BRIEF SUMMARY OF THE INVENTION

The present invention relates to solar collector cover for mounting on existing heat exchange solar collectors. The novel cover substantially improves the efficiency of the collector.

The cover provides a light and solar radiation transferring core material having a plurality of sealed and evacuated cavities or passageways disposed therein.

The thermal insulative properties of a vacuum are well known. By covering a solar collector with a light transferring evacuated area the insulative properties of the vacuum can be utilized to reduce heat loss through the cover. The heat loss through the cover is inversely proportional to the ratio that the evacuated area represents with respect to the total area of the cover. By increasing the amount of vacuum area per area of the cover, the amount of conductive heat transfer can thereby be reduced by a significant amount.

An object of the present invention is to provide a solar collector cover with improved efficiency for use with various designs of solar collectors.

Another object of the instant invention is to provide a solar collector cover for use in increasing the efficiency of flat plate solar collectors.

A further object of the invention is to provide a solar collector cover which is simple in design, easily fabricated, and improves the reduction of heat loss through the cover.

Other objects, advantages and novel features of the present invention will become apparent from the following detailed description of the invention when considered in conjunction with the accompanying drawings.

Of the known prior art devices, none meet the existing need for an efficient solar collector front cover which is simple, compact, inexpensive to produce, is dependable and efficient and is easily adaptable for use in existing solar collectors. The instant invention is directed to a novel solar collector cover which meets all of these existing needs.

BRIEF DESCRIPTION OF THE DRAWINGS

For a better understanding of the invention, as well as other objects and further features thereof, reference is made to the following detailed disclosure of the invention taken in conjunction with the accompanying drawings wherein:

FIG. 1 is an exploded perspective view of the invention;

FIG. 2 is a perspective view illustrating the assembled device in use atop a solar collection unit;

FIG. 3 is a sectional view taken along the lines 3—3 in FIG. 1;

FIG. 4 is an exploded perspective view of a second embodiment of the invention;

DESCRIPTION OF THE PREFERRED EMBODIMENTS

Figure 5:
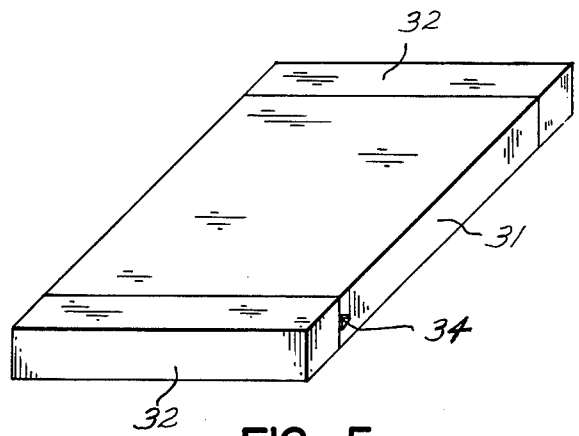
FIG. 5 is a perspective view of the second embodiment illustrating the assembled device.

Referring now to the drawings the solar collector cover of this invention is indicated generally at 10 in FIG. 1. The cover 10 (FIGS. 1 and 3) includes a center block 13 sandwiched between a pair of cover plates 14 and 15. The center block 13, in the form of a hexahedron is transparent or translucent and has a top wall 16, a bottom wall 17 and a peripheral wall made up of a pair of side walls 18 and 19 and a pair of end walls 20 and 21.

Passageways are formed in the center block 13 (FIG. 1) by drilling or forming a plurality of holes 22 through the block from the top wall to the bottom wall. A plurality of grooves 23 are formed in the top surface of the block to fluidly interconnect the holes 22 and a terminal groove 24 is formed in the top surface to fluidly interconnect grooves 23, with the atmosphere at the peripheral wall 21.

Secured to the center block 13 (FIGS. 1 and 2) by an adhesive or the like are the cover plates 14 and 15. The cover plates are also translucent or transparent and hexahedron in shape. Upon securement of the plates to the block with the block 13 sandwiched therebetween the holes and grooves are effectively sealed from the atmosphere with only the terminal groove 24 fluidly open. The terminal groove 24 provides a passageway for the substantial evacuation of the air in the holes 22 and grooves 23. Upon evacuation of the air a plug unit 25 is inserted into the terminal groove to effectively seal it and the passageways thus preventing the entrance of any air thereto.

A second embodiment of the invention is disclosed in FIGS. 4-5 and indicated generally at 30. This embodiment includes a center block 31, a pair of end plates 32 and 33, and a plug unit 34. The center block 31, sandwiched between the end plates, is formed from a transparent or translucent material into a hexahedron, and has a bottom wall 36, a top wall 37, a pair of end walls 38 and 39, and a pair of sidewalls 41 and 42. A plurality of holes 43 are formed through the block from end wall to end wall and a groove 44 is formed in one end wall from a sidewall to all of the holes, thereby fluidly interconnecting them. The end plates 32 and 33 are bonded to the center block 31 and thereby effectively seal the groove and the holes from the atmosphere. A plug unit 34 is disposed in the groove to prevent the reentry of air after the holes and groove have been substantially evacuated of air.

Figure 6:
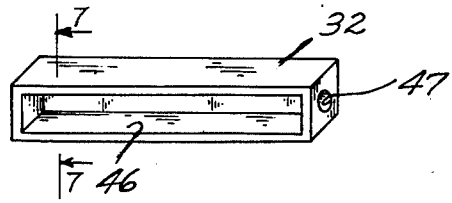
FIG. 6 is a cross sectional view of a modified embodiment of the sealing trough portion of the second embodiment.
Figure 7:
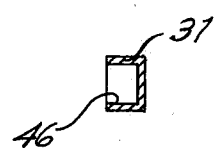
FIG. 7 is a sectional view taken along the lines 7—7 in FIG. 6.

FIGS. 6 and 7 disclose a modified embodiment of an end plate 32 or 33 wherein the interior thereof is hollowed out to form a cavity 46 which replaces the groove 44 in the center block 31. A passage 47 is formed through a side wall which communicates with the cavity 46 and the cavity 46 is in fluid communication with the holes 43, thus permitting the holes and cavity to be evacuated. A plug unit 34 FIG. 5 is then used to seal the passage.

Figure 8:
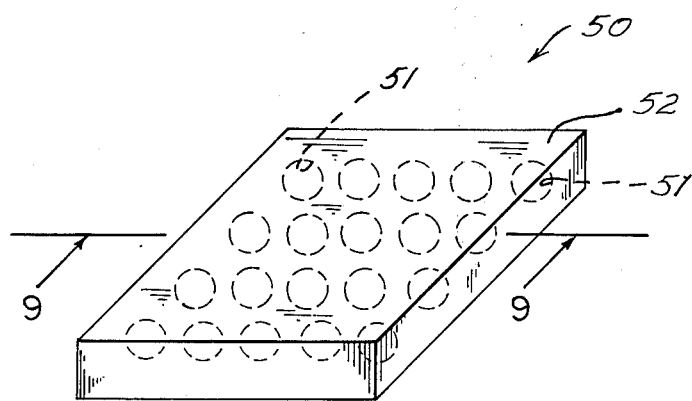
FIG. 8 is a perspective view of a third embodiment of the invention.
Figure 9:
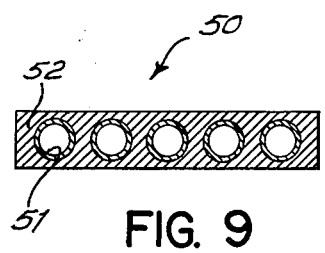
FIG. 9 is a sectional view taken along the lines 9—9 in FIG. 8.

A third embodiment of the invention is depicted in FIGS. 8 and 9 and indicated generally by the numeral 50. This embodiment includes a plurality of hollow, evacuated balls 51 encased in a plastic matrix 52. Although the balls are shown to be of uniform size and spaced equally apart, they can be of varying sizes and arbitrarily spaced to provide the maximum amount of evacuated space within the cover 50.

In certain instances, it may be necessary to utilize a vacuum pump to continuously or frequently evacuate the passages. Under this circumstance the plug unit 34 could include a valve, a vacuum line, and possibly a pump (all not shown).

The center block, covers, or plates can be formed of any solar radiation transferring material such as glass, plastic, fiberglass or the like of sufficient strength to permit the substantial evacuation of air from the passageways and to serve as a cover unit.

With reference to FIG. 2, one potential use of the cover 10 may be seen with specificity. A solar collector unit 56 is depicted of a very general type. An inlet port 58 is provided to allow some medium such as water to enter the collector 56 and an outlet port 57 is provided to allow these same waters to exit once heated. The cover 10 is placed over the collector 56 such that the sun's radiation (not shown) must pass through the cover 10 before the heat radiation may be absorbed by the collector 56. As the collector absorbs heat, the water contained within the collector is heated, and the heated water is removed via the outlet port 57. The cover 10 protects the heat absorption surface of the collector 56 from losing heat, other than to the water, and thereby serves to insulate the collector 56 and to promote the efficiency of the units operation. There are many collector units well known in the art, of which the above is only one, and it is understood that the above collector 56 was depicted for illustration only, and that the cover 10 may be successfully used with any collector where the cover may be operably placed between the collector unit and the sun.

I claim:

1. A removable solar collector cover for placement between a source of radiant energy and a solar collecting unit, the solar collector cover adapted to be placed on top of said solar collecting unit, as a thermal barrier, and between said source of radiant energy, said cover comprising a core unit having a center block, a plug unit, and a plurality of sealed substantially evacuated cavities formed therein, said cavities include a plurality of holes formed in said center block, and at least one groove in said core unit fluidly interconnecting said holes, and said plug unit is secured in said groove to seal said holes and said groove from the atmosphere, said core unit operable to transfer solar radiation therethrough from the source of radiant energy to the solar collector unit.

2. A solar collector cover as defined in claim 1 and said core unit includes a center block, a cover plate and a plug unit; said center block has a top wall, a bottom wall, and a peripheral wall; and said cavities include a plurality of holes formed substantially through said center block from said top wall to proximate said bottom wall, a plurality of grooves formed in said top wall and fluidly interconnecting said holes, and a terminal groove extending from one of said holes to said peripheral wall; said cover plate mounted on said center block top wall wherein said holes and said grooves are covered by said cover plate; and said plug unit is secured in said terminal groove to seal said holes and said grooves from the atmosphere.

3. A solar collector cover as defined in claim 1 and said core unit includes a center block, a pair of cover plates, and a plug unit; said center block having a top wall, a bottom wall, and a peripheral wall; and said cavities include a plurality of holes formed through said center block from said top wall to said bottom wall, a plurality of grooves formed in said top wall and fluidly interconnecting said holes, and a terminal groove extending from one of said holes to said peripheral wall; said center block sandwiched between and secured to said cover plates wherein said holes and said grooves are covered by said cover plates; and said plug unit is secured in said terminal groove to seal said holes and said grooves from the atmosphere.

4. A solar collector cover as defined in claim 1 and said core unit includes a center block, an end plate and a plug unit; said center block has a top wall, a bottom wall, side walls, and end walls; and said cavities include a plurality of holes formed from one said end wall longitudinally through said center block to proximate the other said end wall; and a groove formed in said one said end wall and extending from one said side wall to proximate the other said side wall and fluidly interconnecting said holes; said end plate secured to said center block one end wall to cover said holes and said groove and said plug unit is secured in said groove proximate one said side wall to seal said holes and said groove from the atmosphere.

5. A solar collector cover as defined in claim 1 and said core unit includes a center block, a pair of end plates, and a plug unit; center block has a top wall, a bottom wall, side walls and end walls; and said cavities include a plurality of holes formed from one said end wall to the other said end wall, a groove formed in one said end wall and extending from one said side wall and fluidly interconnecting said holes; said center block sandwiched between and secured to said end plates wherein said holes and grooves are covered; and said plug unit is secured in said groove proximate one said side wall to seal said holes and said groove from the atmosphere.

6. A solar collector cover comprising a core unit having a plurality of sealed substantially evacuated cavities formed therein, said core unit operable to transfer solar radiation therethrough, and said core unit includes a plurality of hollow evacuated balls and a transparent matrix in which said balls are disposed.

* * * * *